United States Patent [19]
Hiraoka et al.

[11] Patent Number: 4,770,234
[45] Date of Patent: Sep. 13, 1988

[54] RESILIENT SUPPORT FOR AUTOMOBILE RADIATOR

[75] Inventors: Kazunari Hiraoka; Yoshiaki Hayamizu, both of Higashihiroshima, Japan

[73] Assignee: Mazda Motor Corporation, Hiroshima, Japan

[21] Appl. No.: 41,684

[22] Filed: Apr. 23, 1987

[30] Foreign Application Priority Data

Apr. 28, 1986 [JP] Japan .................................. 61-98875

[51] Int. Cl.⁴ ................................................ F28F 7/00
[52] U.S. Cl. ........................................ 165/69; 165/67; 180/68.6
[58] Field of Search .................. 165/67, 69; 180/68.4, 180/68.6; 248/232, 634, 635

[56] References Cited

U.S. PATENT DOCUMENTS 4,538,697 9/1985 Muroi et al. ...................... 180/68.4
4,579,184 4/1986 Hiramoto ............................ 180/68.4
4,651,839 3/1987 Isobe .................................. 180/68.4

FOREIGN PATENT DOCUMENTS 2634990 2/1978 Fed. Rep. of Germany ..... 180/68.4
12155 1/1979 Japan ................................. 248/635
36723 3/1983 Japan ................................ 180/68.4

Primary Examiner—Ira S. Lazarus
Assistant Examiner—Peggy Neils
Attorney, Agent, or Firm—Burns, Doane, Swecker & Mathis

[57] ABSTRACT

A resilient support for the support of a radiator assembly in an automobile, which radiator assembly has top and bottom resiliently supported by an automobile body structure by means of respective upper and lower elastic members, the support means constituting a dynamic damper with the radiator assembly acting as an inertia mass. The radiator assembly is supported while tilted in a direction generally parallel to the direction of movement of the automobile, and the upper elastic member is provided with a low rigidity region for reducing the rigidity of the elastic member in a direction up and down. This low rigidity region is provided in the upper elastic member except for a local area of the same upper elastic member which lies on one side of a point of support of the radiator assembly in the direction parallel to the direction of movement of the automobile and on which at least a static load of the radiator assembly tends to concentrate considerably.

14 Claims, 4 Drawing Sheets

RESILIENT SUPPORT FOR AUTOMOBILE RADIATOR

BACKGROUND OF THE INVENTION

The present invention generally relates to an automobile radiator assembly and more particularly to a resilient support for resiliently supporting the automobile radiator assembly in an inclined fashion.

U.S. Pat. No. 4,579,184, patented Apr. 1, 1986, and owned by the same assignee of the present invention, discloses a resilient support for the automobile radiator assembly which comprises two spaced apart lower elastic collars mounted on a lower transverse brace forming a part of an automobile front body structure for the support of the radiator assembly from below; two spaced apart upper elastic collars mounted on an upper transverse brace, forming another part of the automobile front body structure, through respective, generally rectangular plate members for the support of the radiator assembly from above; upper bosses rigidly mounted on top of the radiator assembly and engaged in respective hollows in the upper elastic collars; and lower bosses rigidly secured to the bottom of the radiator assembly and engaged in respective hollows in the lower elastic collars.

Each of the upper collars used in this prior art radiator support system is constituted by a generally tubular body having at one end integrally formed with an outwardly flared hold-down flange which spreads generally radially outwardly when the associated upper boss fast with the radiator assembly is engaged into the hollow of the upper collar. Each upper collar has also formed integrally therewith a pliable mounting flange radially outwardly extending from a generally intermediate portion of the tubular body, said mounting flange having a circumferentially extending and radially inwardly slit groove which, when the respective upper elastic collar is mounted on the associated rectangular plate member having been inserted through a mounting aperture defined in such plate member, receives therein the peripheral lip region of the plate member around the mounting aperture.

In order for the resilient support system to constitute a dynamic damper for suppressing low frequency vibrations induced in the automobile during the operation of a power plant and transmitted to the radiator assembly with the radiator assembly acting as an inertia mass, each of the upper elastic collars is so selected as to have a rigidity smaller than that of any one of the lower elastic collars while permitting the up and down motion of the radiator assembly within the allowance of a certain distance. Formation of a plurality of slots or one or more recesses in the mounting flange of each upper elastic collar is also disclosed as a means for further reducing the rigidity of the respective upper elastic collar as a whole relative to that of any one of the lower elastic collars.

The radiator assembly disclosed in the above mentioned U.S. patent is shown to be supported in an upright position, that is, so as to face generally perpendicular to the direction of forward movement of the automobile.

On the other hand, it is a recent trend to support the radiator assembly in an inclined fashion to promote compactness and simplicity of bodywork at the front body structure and also to promote the marketing appeal of a configuration akin to that of a racing or sports car, such as disclosed in, for example, Japanese Laid-open Patent Publication No. 60-110527, published June 17, 1985, the invention of which is directed to what may be termed as a combined front fender and bumper. So far as the radiator assembly is concerned, this last-mentioned reference merely illustrates the radiator assembly supported in an inclined fashion with its top set backwardly relative to the bottom thereof with respect to the direction of forward movement of the automobile, and makes no more mention of the support system for the radiator assembly.

However, it has been found that, when the radiator assembly is resiliently supported in the inclined fashion with the use of the resilient support system disclosed in the first-mentioned reference, the following problem occurs. Since each of the upper elastic collars used in the first-mentioned reference has, in its entirety, a rigidity smaller than that of any one of the lower elastic collars, it will be excessively compressed at a local portion thereof where a static load of the leaned radiator assembly is centered, the excessively compressed state of that local portion being maintained at all times with the consequence that the elastic hardening thereof is accelerated. Once this happens, the upper elastic collars become susceptible to damage. Moreover, a gap is formed between the outer peripheral surface of each of the upper bosses fast with the radiator assembly and the inner peripheral surface of the respective upper elastic collar, wherefor vibratory motion of the radiator assembly during the operation of the automobile power plant is promoted, thereby facilitating reduction in durability of the upper elastic collars under the influence of impact loads induced by vibrations of the automobile.

Although the radiator assembly is supported in upright position as is the case with the disclosure made in the previously mentioned U.S. Pat. No. 4,579,184, the U.S. Pat. No. 4,538,697, patented Sept. 3, 1985, discloses the radiator assembly having a pair of generally plate-like tabs secured to the top of the radiator assembly so as to protrude upwardly, which tabs are in turn secured to the upper transverse brace, with the intervention of solid elastic members between the tabs and the upper transverse brace, by means of respective bolts extending generally horizontally and passing through the solid elastic member. This U.S. patent also discloses the use of a generally tubular elastic member interposed between the respective tab and the upper transverse tab with the longitudinal axis of the tubular elastic member laid at right angles to the bolt. The resilient support system for the radiator assembly disclosed in this reference is described as constituting a dynamic damper for absorbing vibrations induced in the automotive power plant.

SUMMARY OF THE INVENTION

Accordingly, the present invention has been devised with a view to substantially eliminating the above discussed problem and has for its essential object to provide an improved resilient support for the leaned radiator assembly effective to resiliently support the leaned radiator assembly satisfactorily for a prolonged period of time without substantially inviting any reduction in performance as a dynamic damper.

In order to accomplish the above described object, the present invention provides an improved resilient support for the support of a radiator assembly in an automobile, which radiator assembly has top and bottom resiliently supported by an automobile body structure by means of respective upper and lower elastic members, the support means constituting a dynamic damper with the radiator assembly acting as an inertia mass. The radiator assembly is supported in a tilted fashion leaning in a direction generally parallel to the direction of movement of the automobile, and the upper elastic member is provided with a low rigidity region for reducing the rigidity of the elastic member in a direction up and down. This low rigidity region is provided in the upper elastic member except for a local area of the same upper elastic member which lies on one side of a point of support of the radiator assembly in the direction parallel to the direction of movement of the automobile and on which at least a static load of the radiator assembly tends to concentrate considerably.

Thus, according to the present invention, since at least the local portion of the elastic member where the static load of the leaned radiator assembly tends to be concentrated is so designed as to have a relatively high rigidity, not only can any possible deformation of the elastic member resulting from the static load be suppressed, but also both of wear and damages of the elastic member resulting from the deformation can be minimized.

Moreover, the rigidity of the elastic member in other directions than the direction of movement of the automobile is so selected as to be low enough to permit the displacement of the radiator assembly in a direction up and down to a certain extent, the system can exhibit as a dynamic damper with the radiator assembly acting as an inertia mass.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 1:
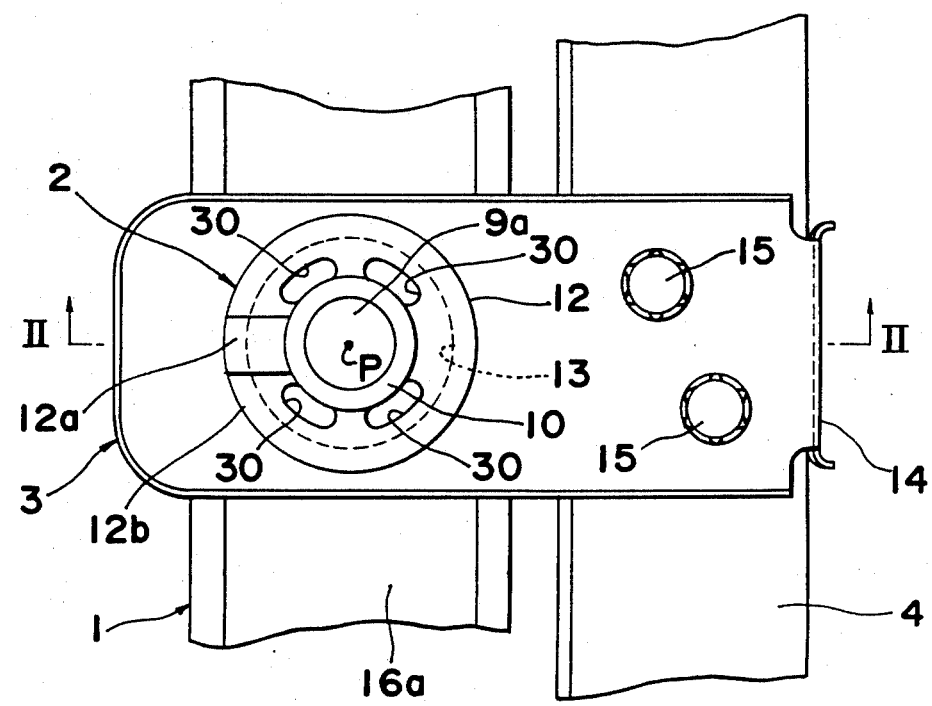
FIG. 1 is a top plan view of one of the two hold-down units for supporting an automobile-mounted radiator assembly.

Before the description of the present invention proceeds, it is to be noted that like parts are designated by like reference numerals throughout the accompanying drawings.

Figure 3:
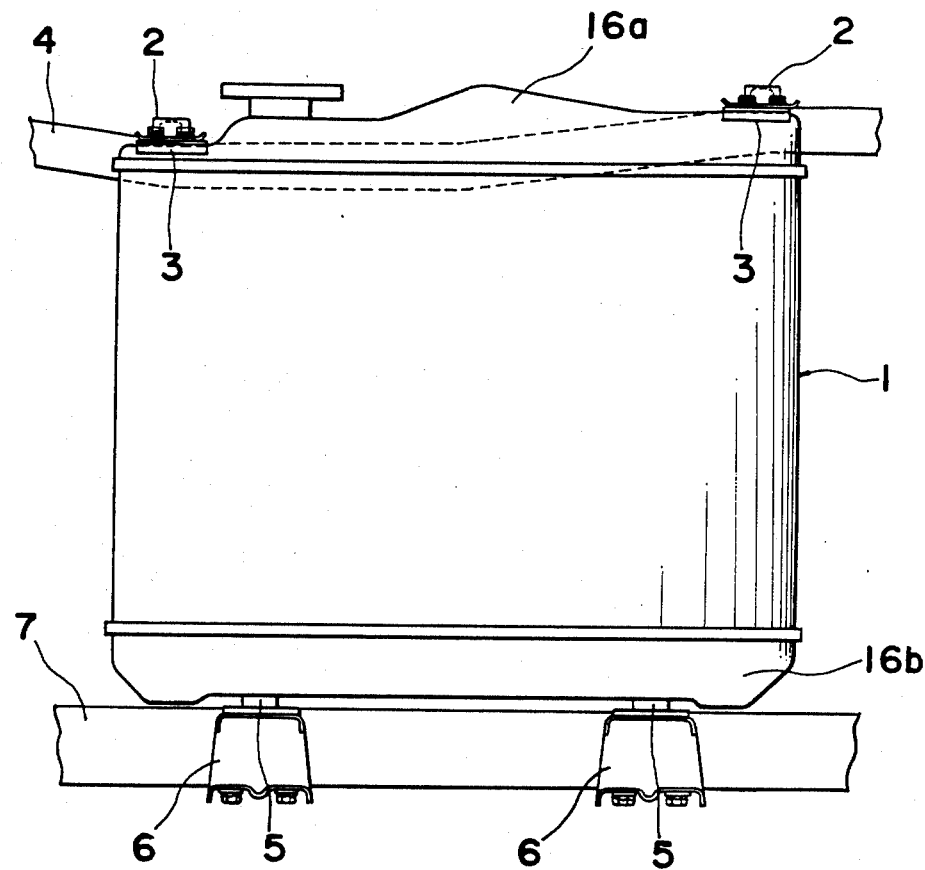
FIG. 3 is a front elevational view of the automobile-mounted radiator assembly showing the manner by which it is resiliently supported between upper and lower transverse braces forming respective parts of an automobile front body structure.
Figure 4:
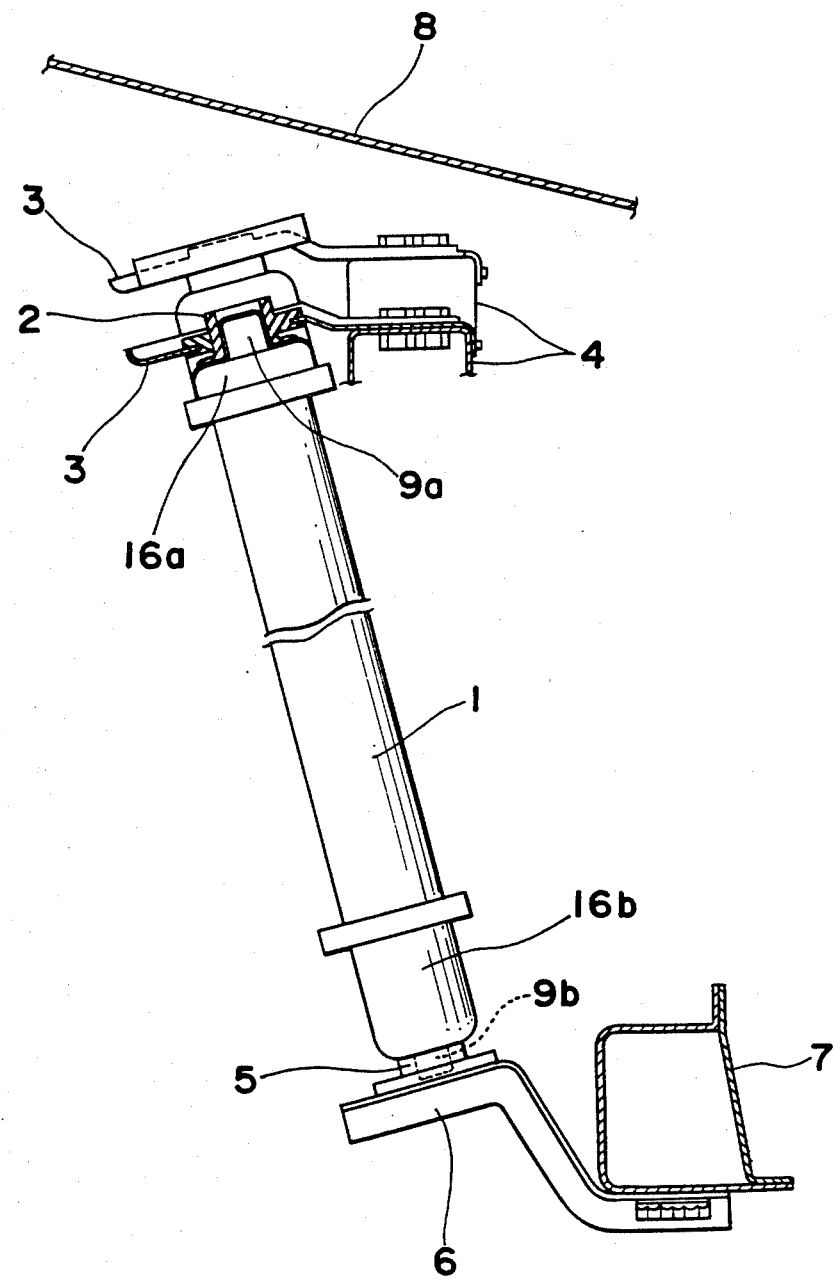
FIG. 4 is a partially sectioned side view, on an enlarged scale, of the radiator assembly shown in FIG. 3.

An automobile front body structure generally has an engine compartment defined therein for the accommodation of an automobile power plant, which compartment has an opening defined at the top thereof and adapted to be selectively opened and closed by a hingedly supported hood shown by 8 in FIG. 4. Within the engine compartment, and referring particularly to FIGS. 3 and 4, the automobile front body structure includes upper and lower transverse braces 4 and 7 positioned one above the other, and extending generally parallel to each other in a direction widthwise thereof, said upper transverse brace 4 being set back relative to the lower transverse brace 7 with respect to the direction of forward movement of the automobile so that a radiator assembly can be supported in inclined fashion with its front face oriented diagonally upwardly, as best shown in FIG. 4.

The radiator assembly comprises a generally rectangular radiator 1 and upper and lower tanks 16a and 16b secured to the top and bottom of the radiator 1 in any known manner and is supported between the upper and lower transverse braces 4 and 7 in a "floating" fashion at four locations. The radiator assembly has a plurality of, for example, four, generally cylindrical bosses 9a and 9b, the two bosses 9a being rigidly mounted on, or otherwise formed integrally with, the top of the upper tank 16a so as to extend upwardly therefrom in spaced relation to each other, whereas the remaining bosses 9b are integrally formed with, or otherwise rigidly secured to, the bottom of the lower tank 16b so as to extend downwardly therefrom in spaced relation to each other.

The lower transverse brace 7 has two spaced apart upholding brackets 6 of identical construction welded or otherwise bolted firmly at one end thereto from below so as to extend rearwardly of the automobile front body structure, the opposite free end of each of the upholding brackets 6 being inclined a certain angle relative to a horizontal plane which may be represented by, for example, a road surface. The free end of each of the upholding brackets 6 has an aperture defined therein for the receipt of a respective elastic collar 5. For supporting the radiator assembly from below, each of the elastic collars 5 on the respective upholding brackets 6 has a through-hole defined therein, into which through-hole is snugly inserted the associated lower boss 9b when the radiator assembly is mounted onto the upholding brackets 6.

On the other hand, the upper transverse brace 4 has two spaced apart hold-down plates 3 of identical construction having a generally rectangular configuration and bolted firmly at a generally intermediate portion to the upper transverse brace 4, by means of bolts 15, in spaced relation to each other for the support of the radiator assembly from above. One end of each of the hold-down plates 3 adjacent the upper transverse brace 4 is bent at a right angle to follow the cross-sectional shape of one corner of the transverse brace 4 and is held in abutment with a side face of the upper transverse brace 4 to avoid any possible lateral motion of the respective hold-down plate 3. The opposite free end of each of the hold-down plates 3 extends rearwardly of the automobile front body structure from the upper transverse brace 4 and is inclined downwardly so as to assume a parallel relationship with the free ends of the respective upholding brackets 6 as best shown in FIG. 4. As will be detailed later, each of the hold-down plates 3 has a respective elastic collar 2 mounted on the free end thereof for the receipt of the associated boss 9a at the top of the radiator assembly.

While the radiator assembly is elastically supported in position between the hold-down plates 3 and the upholding brackets 6 with the upper and lower bosses 9a and 9b received in the upper and lower elastic collars 2 and 5, respectively, each of the upper elastic collars 2 is selected to have a rigidity lower than that of each of the lower elastic collars 5 so that the radiator assembly so supported can be elastically displaceable within the allowance of about 5 to 7 mm in a direction up and down. By so selecting the relative rigidity of the upper and lower elastic collars 2 and 5, a dynamic damper can be formed with the radiator assembly acting as an inertia mass. Also, the inclined support of the radiator assembly permits the design of the hood 8 being lowered in level, such as used in a sports car, while avoiding any possible interference between the hood 8 and the top of the radiator assembly.

Figure 2:
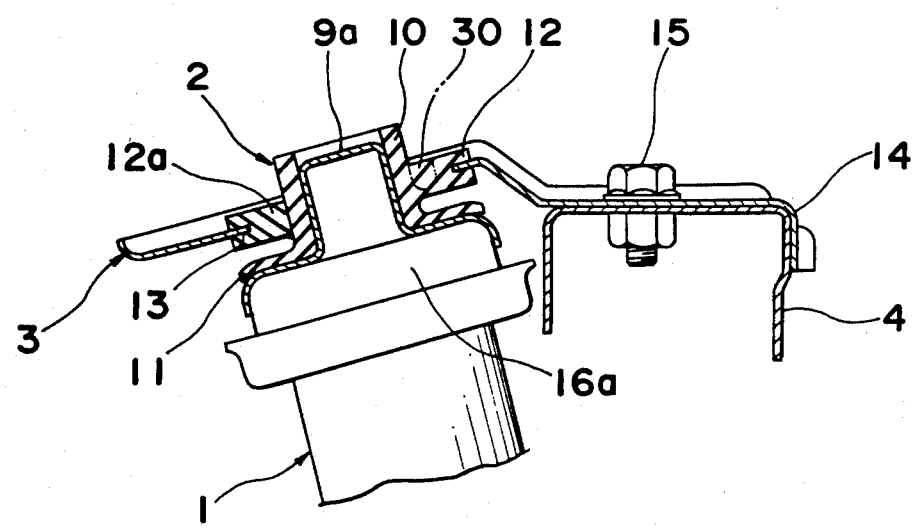
FIG. 2 is a cross-sectional view taken along the line II—II in FIG. 1.

Referring now to FIGS. 1, 2 and 4, each of the hold-down plates 3 has a circular aperture 13 defined therein, and the respective upper elastic collar 2 is inserted in such aperture 13 in a manner which will now be described.

The elastic collar 2 for each hold-down plate 3 is made of rubber or any other elastic material, either natural or synthetic, and comprises a tubular body 10 having an inner diameter sufficient to snugly receive the associated boss 9a at the top of the radiator assembly, a hold-down flange 11 outwardly flared from one end of the tubular body 10, and a mounting flange 12 extending radially outwardly from a substantially intermediate portion of the tubular body 10. Each elastic collar 2 of the construction described above is inserted in the mounting aperture 13 in the respective hold-down plate 3 and carried thereby in a manner with the peripheral lip region around the mounting aperture 13 wedged circumferentially exteriorly into the associated mounting flange 12 as best shown in FIG. 2. This can be accomplished during the molding of the respective elastic collar 2 and, therefore, the peripheral lip region around the mounting aperture 13 in the associated hold-down plate 3 which is wedged radially inwardly of the mounting flange 12 is in practice welded to the respective elastic collar 2. With the elastic collar 2 so mounted on the hold-down plate 3 in alignment with the mounting aperture 13, the outwardly flared hold-down flange 11 is positioned downwardly, as viewed in FIGS. 2 and 4, of the associated hold-down plate 3 and will expand radially outwardly against its own resiliency in contact with an annular surface portion of the upper tank 16a around the associated boss 9a when the latter is inserted into the tubular body 10 from below as shown in FIG. 2.

Thus, it is clear that the radiator assembly is elastically supported at the four locations by the upper and lower transverse braces 4 and 7 fast with the automobile front body structure with the lower bosses 9b mounted on the upholding brackets 6 through the respective elastic collars 5 and with the upper bosses 9a received in the respective elastic collars 2, while the body of the radiator assembly is inclined in the manner as hereinbefore described. Except for the inclined feature wherein the radiator assembly is leaned rearward with respect to the direction of forward movement of the automobile, the support system so far described is substantially similar to that disclosed in U.S. Pat. No. 4,579,184.

In accordance with the present invention, a rearwardly oriented portion 12a of the mounting flange 12 in each of the upper elastic collars 2, where a static load tends to be centered having been transmitted from the leaning radiator assembly through the respective boss 9a, which portion 12a is located on one side of a point P of support of the radiator assembly (the longitudinal axis of the respective boss 9a) with respect to the direction of movement of the automobile, is selected to have a rigidity higher than that of any one of the remaining portions 12b of the mounting flange 12, the tubular body 10 and the outwardly flared flange 11. The rigidity of that rearwardly oriented portion 12a of the mounting flange 12 in each of the upper elastic collars 2 suffices to be of such a value that rearwardly oriented portion 12a will not substantially undergo any elastic deformation even though the static load referred to hereinabove acts thereon. In order for the rigidity of the remaining portion 12b of the mounting flange 12 in each elastic collar 2 to be relatively reduced, the remaining portion 12b is formed with one or more grooves or recesses 30 defined therein so as to extend a certain depth in a direction of thickness of the associated mounting flange.

While the support system for the support of the automobile radiator assembly is constructed as hereinbefore described, it is generally well known that, when and so long as the radiator assembly is supported in an inclined fashion with the upper tank 16a positioned rearwardly of the lower tank 16b in the direction of forward movement of the automobile such as in the present invention, a component of force acting in a direction generally perpendicular to the direction in which the radiator assembly is leaned acts, as a static load, on each of the elastic collars 2, mounted on the respective hold-down plates 3, rearwardly from the support point P, that is, through the associated boss 9a on top of the upper tank 19a.

However, since as hereinbefore described, the mounting flange 12 of each of the elastic collars 2 has that portion 12a having a higher rigidity than the remaining portion 12b of the same mounting flange 12, which portion 12a is located where it meets the associated boss 9a tending to lean rearwardly together with the radiator assembly, the application of the static load to that portion 12a of each mounting flange 12 through the associated boss 9a for a substantially prolonged period of time would result in no substantial deformation of such relatively rigid portion 12b and, therefore, no substantial elastic hardening which would otherwise result from such deformation is accelerated. Moreover, since there is no substantial possibility that a gap will be formed between the outer peripheral surface of each of the bosses 9a and the inner peripheral surface of the associated tubular body 10 of the respective elastic collar 2, back and forth motion of the radiator assembly resulting from automobile-induced vibrations during the operation of the automobile power plant including an engine, a transmission, a clutch and gears can be suppressed with the consequence that impact loads which would act on each of the elastic collars 2 is advantageously minimized. Consequent upon these features inherent in the present invention, any possible wear and/or damage of the elastic collars 2 can effectively be avoided with the durability consequently prolonged.

Furthermore, since the remaining portion 12b of each of the mounting flanges 12 in the elastic collars 2 is so tailored as to have a rigidity lower than that of that portion 12a thereof, and since the elastic collars 2 as a whole are so designed as to allow the up and down motion of the radiator assembly to a certain extent, they can exhibit a function of dynamic damper with the radiator assembly acting as an inertia mass and, therefore, low frequency vibrations induced in the automobile during the operation of the power plant can also be effectively suppressed.

In the foregoing embodiment, the upper bosses 9a have been shown and described as formed or otherwise mounted on the upper tank 16a fast with the radiator 1 and the upper elastic collars 2 have been shown and described as mounted on the respective hold-down plates 3. However, both may be reversed in position relative to each other as will now be described with particular reference to FIGS. 5 and 6 illustrating another preferred embodiment of the present invention.

Figure 5:
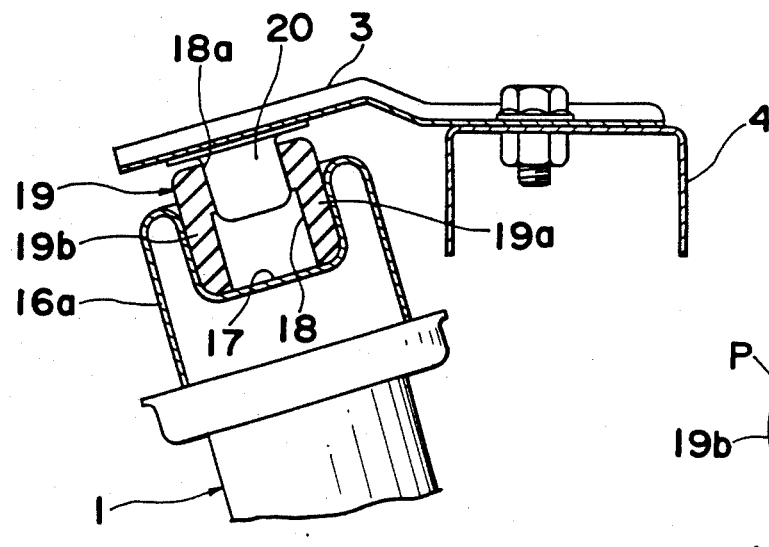
FIG. 5 is a view similar to FIG. 2, showing another preferred embodiment of the present invention.

As shown in FIG. 5, at the top of the upper tank 16a, the upper tank 16a is formed with two spaced apart bearing recesses 17, into which recesses elastic collars 19 each in the form of an elastic tubular body are snugly seated. Each of the elastic collars 19 has a cylindrical hollow 18 defined therein over the axial length thereof, said hollow 18 being partially reduced in diameter at one end of the respective collar 19 remote from the associated recess 17 to provide a diametrically reduced opening 18a.

Each of the hold-down plates 3 mounted on the upper transverse brace 4 in a manner similar to that as hereinbefore described in connection with the first preferred embodiment of the present invention has a respective cylindrical boss 20 rigidly secured thereto, or otherwise formed integrally therewith by the use of any known press work, so as to protrude generally downwardly. These bosses 20 are, when the radiator assembly is completely supported, engaged in the respective elastic collars 19 through the diametrically reduced openings 18a as best shown in FIG. 5.

Figure 6:
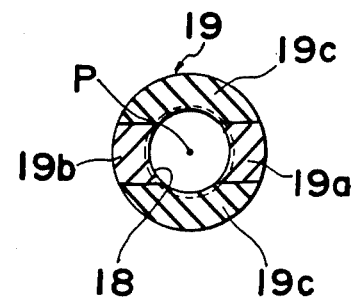
FIG. 6 is a transverse sectional view of an elastic mount shown in FIG. 5.

As best shown in FIG. 6, each of the elastic collars 20 has relatively rigid portions 19a and 19b spaced 180° from each other in a direction circumferentially thereof and in a direction conforming to the direction in which the static load, as hereinbefore discussed in connection with the foregoing embodiment, acts, each of which portions 19a and 19b has a higher rigidity than that of any one of the correspondingly circumferentially spaced remaining portion 19c.

The arrangement according to the second preferred embodiment of the present invention does not only bring about advantages similar to those afforded by the foregoing embodiment, but also brings about an additional advantage. Specifically, since there are two relatively rigid portions, that is, the portions 19a and 19b, spaced in the direction conforming to the direction in which the static load acts and located on respective sides of the cylindrical hollow 18 in the associated elastic collar 19, the back and forth motion of the radiator assembly resulting from the automobile-induced vibrations can be suppressed more effectively than that afforded by the foregoing embodiment.

In the following embodiments of the present invention which will now be described with reference to FIGS. 7 and 8 and FIG. 9, respectively, each of the elastic collars 2, while substantially identical in shape to the elastic collar 3 shown in and described with reference to FIGS. 1 to 4, is formed by molding and vulcanizing the elastic molding material. During the molding, the four recesses 30 are simultaneously formed in the associated mounting flange 12 at specific locations effective not only to minimize any possible deformation of the associated tubular body 10 in a direction lengthwise of the automobile, but also to minimize transmission of vibrations in a direction transversely with respect to the lengthwise direction of the automobile.

Figure 7:
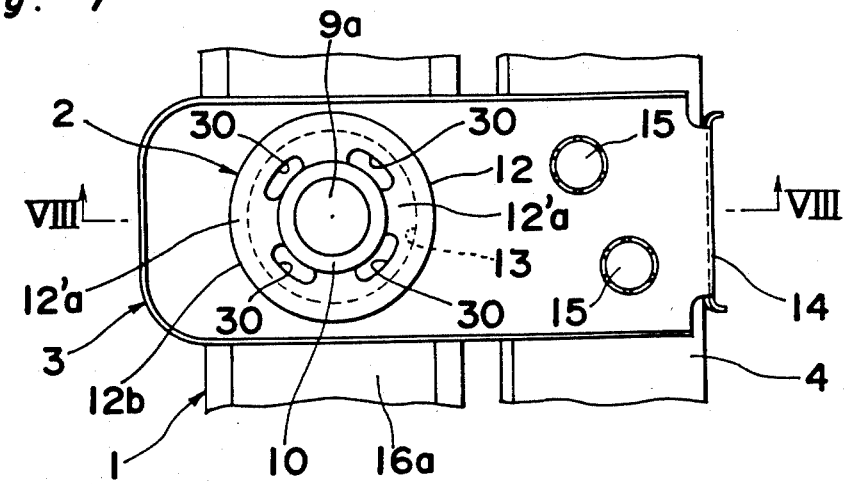
FIG. 7 is a view similar to FIG. 1, showing the radiator support system according to a third preferred embodiment of the present invention.
Figure 8:
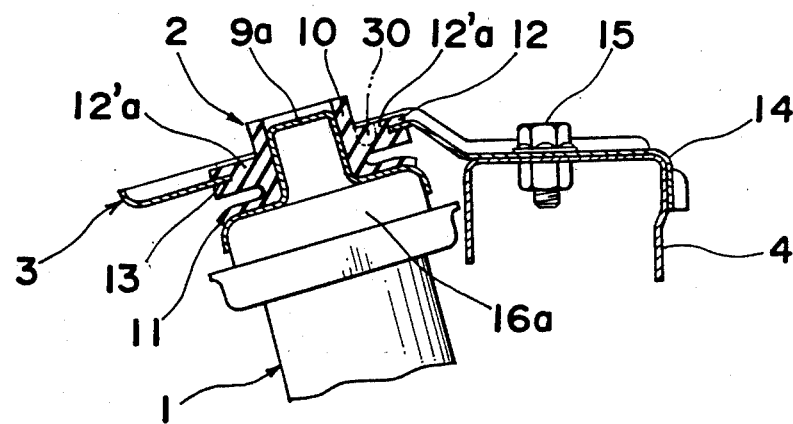
FIG. 8 is a cross-sectional view taken along the line VIII—VIII in FIG. 7.

More specifically, in the embodiment shown in FIGS. 7 and 8, the four recesses 30 are spaced an equal distance from each other in a direction circumferentially of the associated mounting flange 12 and so positioned and so shaped that both of those opposite portions 12'a of the mounting flange 12 which confront in the direction of movement of the automobile and substantially parallel to the longitudinal axis of the associated hold-down plate 3 and those opposite portions of the same mounting flange 12 which confront in a direction perpendicular to the direction of movement of the automobile and substantially parallel to the longitudinal axis of the upper transverse brace 4 can have an equal rigidity which is higher than the portions of the same mounting flange 12 where the respective recesses 30 are formed. According to this embodiment, the amount of deflection of the mounting flange 10 relative to the tubular body 10 can be rendered to be uniform all over the circumference of the mounting flange 12.

Figure 9:
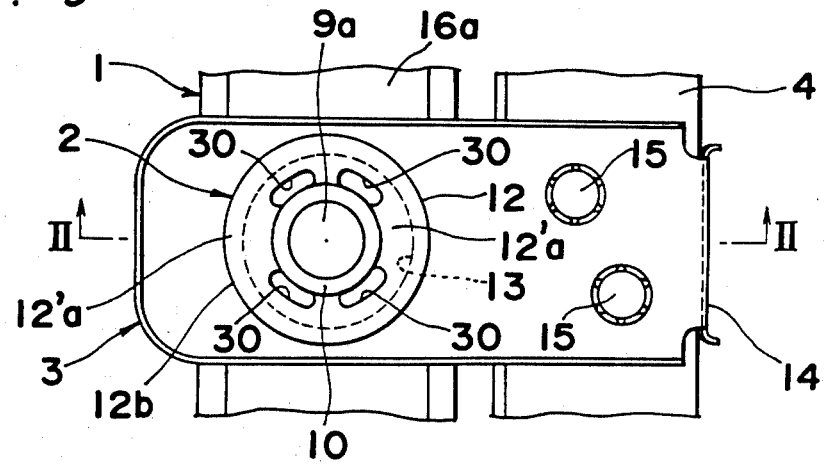
FIG. 9 is a view similar to FIG. 1, showing the radiator support system according to a fourth preferred embodiment of the present invention.

In the embodiment shown in FIG. 9, the four recesses 30 are so spaced and so positioned that the angular distance between each neighboring two recesses 30 located on a respective side of the plane parallel to the direction of movement of the automobile and passing through the longitudinal axis of the associated boss 9 can be smaller than that between each neighboring two recesses 30 located on a respective side of a plane perpendicular to the direction of movement of the automobile and passing through the longitudinal axis of the associated boss 9. Accordingly, unlike the opposite portions 12'a of the mounting flange 12 shown in and described with reference to FIGS. 7 and 8, the opposite portions 12'a of the mounting flange 12 in the embodiment shown in FIG. 9 have a higher rigidity than that of the opposite portions of the same mounting flange 12 which confront in the direction perpendicular to the direction of movement of the automobile. The embodiment shown in and described with reference to FIG. 9 is advantageous in that the radiator having a relatively great weight and/or tilted at a relatively great angle of inclination can be supported satisfactorily.

Although the present invention has been fully in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A resilient support means for the support of a radiator assembly in an automobile, said radiator assembly having a top and a bottom resiliently supported by an automobile body structure through upper and lower elastic mounting means so as to form a dynamic damper with the radiator assembly acting as an inertia mass, said radiator assembly being mounted so as to be tilted with reespect to the direction of forward movement of the automobile, said upper elastic mounting means being provided with a low rigidity region for reducing the rigidity in a direction up and down at a location except for at least a location where a static load acts in a direction parallel to the direction of movement of the automobile relative to a point of center of support of the radiator assembly and wherein the low rigidity region is also provided at a location except for a direction generally transverse to the direction of movement of the automobile relative to the support point.

2. The resilient support means as claimed in claim 1, wherein in the upper elastic mounting means the rigidity in the direction parallel to the direction of movement of the automobile relative to the support point and the rigidity in the direction transversely of the direction of movement of the automobile relative to the support point are equal to each other.

3. The resilient support means as claimed in claim 2, wherein the radiator assembly has its top formed with at least one boss protruding upwardly therefrom, and wherein the upper elastic mounting member comprises a generally tubular body engageable with the boss and a mounting flange protruding radially outwardly from the tubular body and welded to the automobile body structure, said low rigidity region being constituted by recesses defined at a location except for the directions parallel to and transversely of the direction of movement of the automobile.

4. The resilient support means as claimed in claim 3, wherein each of said recesses opens either upwardly or downwardly in a direction generally parallel to the tubular body and represents a generally arcuate shape curved about the support point, spacings each between the neighboring recesses, which lie in the respective directions parallel to and transversely of the direction of movement of the automobile, being equal to each other.

5. The resilient support means as claimed in claim 1, wherein in the upper elastic mounting member the rigidity in the direction parallel to the direction of movement of the automobile relative to the support point is higher than the rigidity in the direction transversely of the direction of movement of the automobile relative to the support point.

6. The resilient support means as claimed in claim 5, wherein the radiator assembly has its top formed with at least one boss protruding upwardly therefrom, and wherein the upper elastic mounting member comprises a generally tubular body engageable with the boss and a mounting flange protruding radially outwardly from the tubular body and welded to the automobile body structure, said low rigidity region being constituted by recesses defined at a location except for the directions parallel to and transversely of the direction of movement of the automobile.

7. The resilient support means as claimed in claim 6, wherein each of the recesses opens either upwardly or downwardly in a direction generally parallel to the tubular body and represents a generally arcuate shape curved about the support point, spacings each between the neighboring recesses lying in the direction parallel to the direction of movement of the automobile being selected to be greater than spacings each between the neighboring recesses lying in the direction transversely of the direction of movement of the automobile.

8. The resilient support means as claimed in claim 1, wherein the radiator assembly has its upper portion formed with at least one boss protruding outwardly therefrom, and wherein the upper elastic mounting member comprises a generally tubular body engageable with the boss and a mounting flange protruding radially outwardly from the tubular body and welded to the automobile body structure, said low rigidity region being constituted by recesses defined in the mounting flange, a wall portion between the neighboring recesses being provided in the direction parallel to the direction of movement of the automobile relative to the support point.

9. The resilient support means as claimed in claim 1, wherein in the upper elastic mounting means the hardness of a rubber material on at least one side in which the static load acts in the direction parallel to the direction of movement of the automobile relative to the support point is higher than that of a rubber material therearound.

10. A resilient support means for the support of a radiator assembly in an automobile, said radiator assembly having a top and a bottom resiliently supported by an automobile body structure through upper and lower elastic mounting means so as to form a dynamic damper with the radiator assembly acting as an inertia mass, said radiator assembly being mounted so as to be tilted with respect to the direction of forward movement of the automobile, said upper elastic mounting means being provided with a low rigidity region for reducing the rigidity in a direction up and down at a location except for at least a location where a static load acts in a direction parallel to the direction of movement of the automobile relative to a point of center of support of the radiator assembly, said upper elastic mounting means having generally arcuate recesses defined therein providing said low rigidity region.

11. The resilient support means as claimed in claim 10, wherein said generally arcuate recesses comprise four recesses that are disposed at locations except for the directions parallel to and transverse to the direction of movement of the automobile.

12. The resilient support means as claimed in claim 11, wherein the radiator assembly has its top formed with at least one boss protruding upwardly therefrom, and wherein the upper elastic mounting member comprises a generally tubular body engageable with the boss in a mounting flange protruding radially outwardly from the tubular body and welded to the automobile body structure, said low rigidity region being constituted by recesses defined at a location except for the directions parallel to and transverse to the direction of movement of the automobile.

13. The resilient support means as claimed in claim 12 wherein each of said recesses opens either upwardly or downwardly in a direction generally parallel to the tubular body and represenss a generally arcuate shape curved about the support point, spacings between the neighboring recesses, which lie in the respective directions parallel to and transverse to the direction of movement of the automobile, being equal to each other.

14. The resilient support means as claimed in claim 12 wherein each of said recesses opens either upwardly or downwardly in a direction generally parallel to the tubular body and represents a generally arcuate shape curved about the support point, spacings between the neighboring recesses lying in a direction parallel to the direction of movement of the automobile being selected to be greater than spacings between the neighboring recesses lying in the direction transverse to the direction of movement of the automobile.

* * * * *